Dec. 23, 1958     G. A. LYON     2,865,677
WHEEL COVER
Filed Oct. 7, 1954
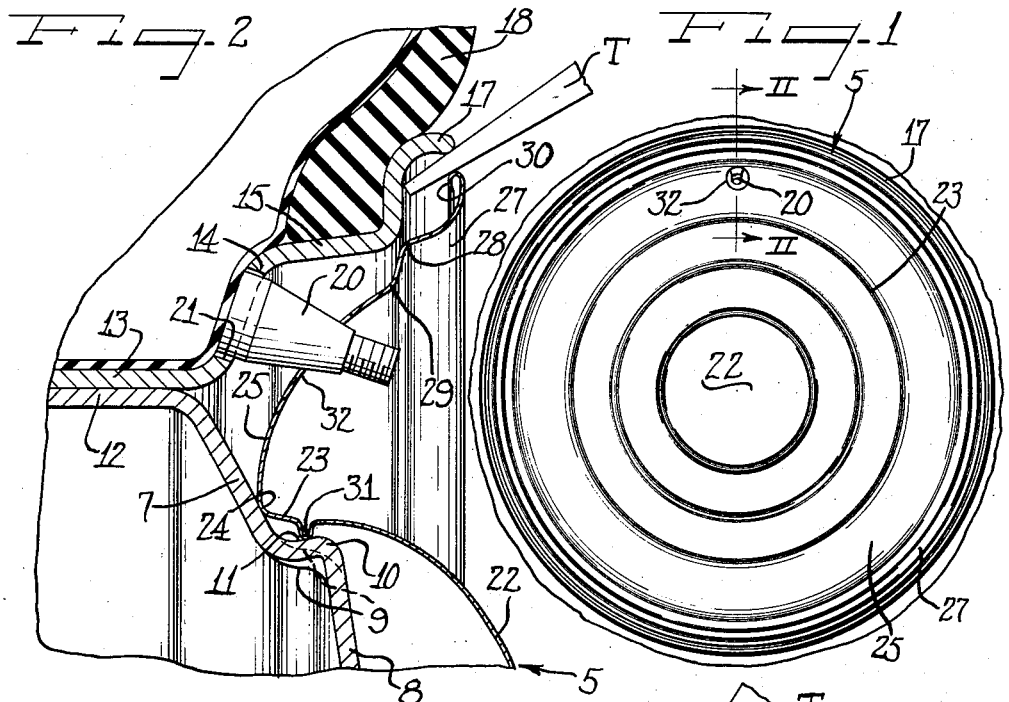
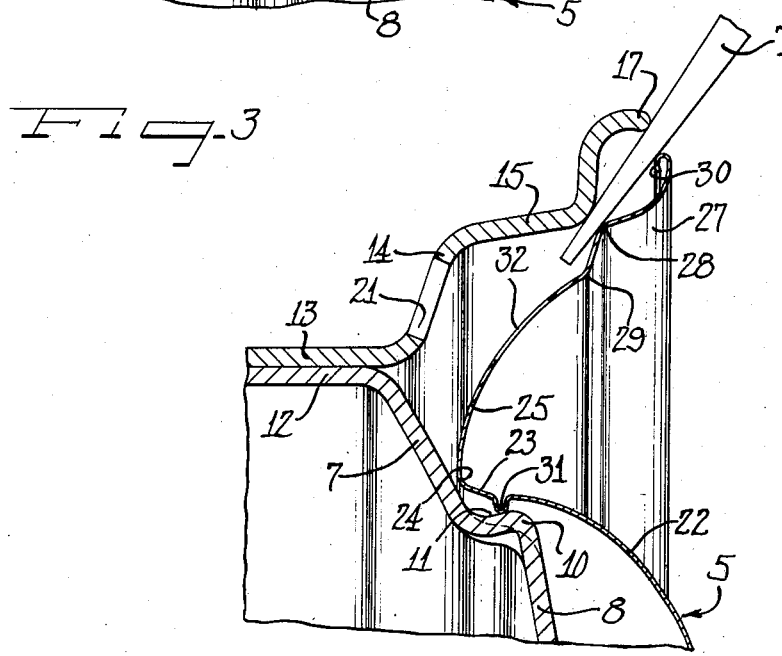
George Albert Lyon United States Patent Office 2,865,677
Patented Dec. 23, 1958

2,865,677

WHEEL COVER

George Albert Lyon, Detroit, Mich.

Application October 7, 1954, Serial No. 460,937

2 Claims. (Cl. 301—37)

The present invention is concerned with improvements in wheel structures and more particularly relates to the ornamental and protective covering on the outer sides of vehicle wheels.

An important object of the present invention is to provide an improved wheel structure having thereon novel cover means for snap-on, pry-off cooperation with the wheel.

Another object of the invention is to provide an improved cover for cooperative interengagement with retaining bumps on a vehicle wheel body.

A further object of the invention is to provide an improved wheel cover that is adapted to be made from a single sheet metal stamping and is provided with a novel arrangement of means for snap-on, pry-off intereng.gement with retaining bumps on a vehicle wheel.

Other objects, features and advantages of the present invention will be readily apparent from the following detailed description of a preferred embodiment thereof taken in conjunction with the accompanying drawing in which:

Figure 1 is an outer side elevational view of a vehicle wheel structure embodying features of the invention;

Figure 2 is an enlarged fragmentary radial sectional view taken substantially on the line II—II of Figure 1; and Figure 3 is a sectional view similar to Figure 2 but showing the cover during pry-off from the wheel.

According to the present invention a cover 5 is constructed and arranged to be applied to the outer side of a vehicle wheel on the order of the wheel structure covered in my issued Patent No. 2,445,330, dated July 20, 1948. To this end, the wheel is provided with a disk spider wheel body 7 having an annular intermediate nose bulge 8 having at its radially outer side a generally radially outwardly facing shoulder 9 provided at suitable intervals such as 3 with generally radially outwardly projecting cover retaining bumps 10 having undercut generally radially and axially inwardly sloping and generally radially outwardly and axially inwardly facing respective cover-retaining shoulders 11. Radially outwardly spaced from the shoulder 9, there is provided on the wheel body an axially inwardly directed attachment flange 12 secured in suitable manner to a base flange 13 of a multi-flange, drop center tire rim. At the outer side of the tire rim is a generally axially outwardly facing side flange 14 merging with a generally radially and axially outwardly oblique, generally radially inwardly facing intermediate flange 15 which merges with a radially outwardly and then axially outwardly directed terminal flange 17. A pneumatic tire and tube assembly 18 or a tubeless tire is adapted to be supported by the tire rim and has a valve stem 20 for inflation thereof projecting outwardly from or through a valve stem aperture 21 in the side flange 14.

The cover 5 is of an overall diameter to substantially completely cover the outer side of the wheel and to this end has a central crown portion 22 provided with a generally axially extending side wall 23 of a diameter somewhat larger than the maximum diameter described about the retaining bumps 10 so that in assembly with the wheel the side wall 23 will fit in spaced telescoping relation about the bumps. At its axially inner end the side wall 23 has an angular juncture 24 with a dished radially and axially outwardly directed annular outer cover portion 25 which in assembly with the wheel is adapted to overlie the juncture between the tire rim and the wheel body and to substantially overlie the outer side of the tire rim.

At its radially outer extremity the dished cover portion 25 has an annular outwardly convex rib-like marginal formation 27 joining the main inwardly dished area of the cover portion 25 on an annular reinforcing rib 28 adapted in assembly to lie opposite and in spaced relation to the juncture shoulder between the intermediate and terminal flanges 15 and 17 of the tire rim. Radially inwardly from the shoulder 28 is a preferably outwardly directed reinforcing shoulder 29. At its outer extremity the annular marginal cover portion 27 has an underturned reinforcing and finishing bead flange 30 which normally lies in spaced relation opposite the tip or terminus of the terminal flange 17.

For retaining engagement with the retaining bumps 10, the side wall 23 of the cover crown has a radially inwardly directed annular radially outwardly opening rib 31 of an inside or tip or ridge diameter slightly smaller than the diameter described about the bump shoulders 11. Moreover, the bump engaging rib 31 is located substantially axially outwardly relative to the angular juncture 24. Thereby, the shallow retaining rib 31 is resiliently flexible with the side wall 23 axially outwardly from the rib-like juncture 24 for snapping over the retaining bumps 10 into and out of engagement with the angular retaining shoulders 11 thereof.

In applying the cover 5 to the wheel, a valve stem aperture 32 in the outer annular cover portion 25 is placed in registration with the valve stem 20 and the cover is pressed axially inwardly by pressure applied against the crown portion 22. This causes the retaining rib 31 to cam over the noses of the retaining bumps 10 by radially outward flexure of the rib 31 and the contiguous portions of the crown side wall 23 and radially inward deflectional drawing in of the portions of the rib and side wall intermediate the retaining bumps. Then when the rib 31 has passed the radially outermost nose projections of the retaining bumps 10, the rib resiliently draws radially inwardly on the retaining shoulders 11 and thereby cams generally axially inwardly and draws the cover axially inwardly so that the angular juncture shoulder 24 bottoms firmly against the wheel body 7.

It will be observed that by virtue of the stop or limit upon axially inward movement provided by the shoulder 24 so that inward camming of the retaining rib or shoulder 31 along the retaining bump faces 11 is limited to only a short distance from the axially outermost ends of the retaining bump shoulders 11 at the radially outermost projection of the nose portions of the retaining bumps, only slight resilient flexure of the retaining rib or shoulder 31 will accomplish retaining interengagement with the retaining bumps. Hence, the retaining rib shoulder 31 may be fairly stiff in its resilience and yet require only nominal axially inward pressure on the cover to cause the rib to snap into retaining engagement with the bumps. In fact, since as an incident to inward canting of the cover toward the valve stem 20 as an incident to applying the cover to the wheel, the rib 31 will engage at the undercut of the adjacent one or two bumps 10 so that only the limited flexure necessary to cam the rib 31 over the remaining one or two bumps will result in full, firmly gripping, resiliently stressed cooperation of the retaining rib 31 with the bumps 10. Since the bottoming juncture rib 24 of the cover limits the axially inward disposition of the cover, uniformly entirely about the wheel, a positive limit is placed upon axially inward camming of the rib 31 along the bump shoulders 11 and thus the rib 31 is maintained in tight, completely rattle-free and strongly gripping relation to the axially outer portions of the bump shoulders.

When it is desired to remove the cover from the wheel, a pry-off tool T such as a screw driver is inserted between the outer margin of the cover and the terminal flange 17 and pry-off force is exerted against the terminal bead 30 and then successively against the reinforcing and pry-off rib 28, as shown successively in Figures 2 and 3. Inasmuch as the retaining rib 31 on the cover is maintained in assembly rather close to the axially outer limit of the retaining bump shoulders 11, and although the retaining rib 31 quite effectively maintains engagement under all customary service conditions, moderate pry-off force applied to the outer reinforced pry-off rib margin of the cover will be effective to dislodge the cover from the wheel.

It will be understood that modifications and variations may be effected without departing from the scope of the novel concepts of the present invention.

I claim as my invention:

1. In a wheel structure including a tire rim and a disk spider wheel body supporting the same and provided radially inwardly from juncture with the tire rim with generally radially outwardly facing retaining bumps having undercut cover-retaining shoulders merging with the wheel body and extending generally radially and axially inwardly from noses on the bumps, a cover for disposition at the outer side of the wheel including a central crown portion and a side wall having a stop extremity engageable with the wheel body radially outwardly from the juncture of the bumps with the wheel body, said side wall including an annular cover-retaining generally radially inwardly directed radially resiliently flexibly deflectable rib spaced axially outwardly from said stop extremity, and having at both the axially inner and axially outer sides thereof radially resiliently flexible annular portions of said side wall so as to be radially flexible therewith and engageable under resilient tension with the undercut shoulders of the bumps adjacent to the bump noses and maintained against camming further axially inwardly by said stop extremity engaging the wheel body, the cover having in addition a generally radially and axially outwardly directed cover portion extending from said stop extremity and disposed for overlying relation to the tire rim, said last mentioned cover portion having a plurality of outer marginal annular reinforcing ribs providing pry-off shoulders engageable with a pry-off tool for exerting pry-off force to disengage the retaining rib from the bumps.

2. In a wheel structure including a tire rim and a wheel body supporting the same and provided with a generally axially outwardly projecting annular nose bulge having pressed from the radially outer side thereof at circumferentially spaced points a plurality of generally radially outwardly projecting cover retaining bumps of substantial axial length and with generally undercut radially and axially inwardly sloping cover retaining shoulders, a cover for disposition at the outer side of the wheel including a central crown portion for overlying the wheel body and a radially outer tire rim covering portion with a generally axially inwardly extending and radially, resiliently deflectable side wall on the crown portion joining said radially outer cover portion, said side wall being of a diameter slightly larger than the diameter about the nose portions of the retaining bumps so as to be telescopically disposable in spaced relation thereabout, said side wall having an annular cover-retaining generally radially inwardly projecting and radially resiliently flexibly deflectable rib spaced substantially axially outwardly from the inner terminus of said side wall and also spaced substantially from the axially outer end of said side wall so as to have on the opposite axial sides of the rib substantial width annular flexible panel portions of the side wall whereby the rib is resiliently flexible therewith, the rib being of a slightly smaller diameter than the diameter described about the nose portions of the retaining bumps and being thus engageable retainingly with the retaining bumps upon being flexed thereover and under resilient tension engaging with said retaining shoulders of the bumps and tending by the resilient tension to cam generally axially inwardly along said retaining shoulders, the cover having a portion thereof engageable with the wheel to limit the axially inward movement of the cover incident to axially inward camming of said retaining rib along the bump shoulders and thereby maintain the rib adjacent to the nose portions of the bumps under resilient retaining tension and prevent the rib from camming further axially inwardly along the bump shoulders.

References Cited in the file of this patent

UNITED STATES PATENTS 2,020,885 Gatta _____ Nov. 12, 1935
2,525,816 Lyon _____ Oct. 17, 1950